United States Patent [19]

Nakanishi et al.

[11] 3,978,162

[45] Aug. 31, 1976

[54] PROCESS FOR PRODUCING VINYL CHLORIDE GRAFT COPOLYMERS

[75] Inventors: Kakusaburo Nakanishi, Uozu; Tatsuro Yoshida, Namerikawa, both of Japan

[73] Assignee: Ryo-Nichi Co., Ltd., Japan

[22] Filed: July 7, 1975

[21] Appl. No.: 593,508

[52] U.S. Cl............................................. 260/878 R
[51] Int. Cl.$^2$.................... C08F 2/18; C08F 255/06; C08L 23/28
[58] Field of Search ................................ 260/878 R

[56] References Cited
UNITED STATES PATENTS

| | | | |
|---|---|---|---|
| 3,347,956 | 10/1967 | Rademacher | 260/878 R |
| 3,891,720 | 6/1975 | Severini et al. | 260/878 R |
| 3,906,059 | 9/1975 | Oba et al. | 260/878 R |

OTHER PUBLICATIONS

Hackh's "Chemical Dictionary", McGraw–Hill, New York (1969) p. 130.

*Primary Examiner*—Alan Holler
*Attorney, Agent, or Firm*—Bierman & Bierman

[57] ABSTRACT

A process for producing a vinyl chloride grapht copolymer, wherein vinyl chloride is graft polymerized onto an ethylene-propylene-diene copolymer to produce a vinyl chloride graft copolymer containing 10 to 60% by weight of the ethylene-propylene-diene copolymer, carried out in the form of suspension polymerization in aqueous phase in the presence of an aliphatic alcohol of not less than 8 carbon atoms.

6 Claims, No Drawings

PROCESS FOR PRODUCING VINYL CHLORIDE GRAFT COPOLYMERS

This invention relates to a process for producing a vinyl chloride graft copolymer wherein vinyl chloride is graft-polymerized onto an ethylene-propylene-diene copolymer (hereinafter referred to as "EPT elastomer") thereby to obtain a vinyl chloride graft copolymer containing 10 to 60% by weight of the EPT elastomer characterized in that said graft-polymerization is carried out in the form of suspension polymerization in aqueous phase in the presence of an aliphatic alcohol of not less than 8 carbon atoms.

As processes for producing impact resistant vinyl chloride resins containing EPT elastomers, there have been generally known a process in which a graft copolymer high in content of EPT elastomer is prepared and is blended with a vinyl chloride resin, and a process in which a graft copolymer less in content of EPT elastomer is prepared and is used as it is. A comparison in economy between the impact resistant vinyl chloride resins obtained by the said two processes shows that when the content of EPT elastomer is made same in order to obtain resins identical in impact resistance value with each other, the resin of the former process is not only obtainable at a lower cost than that obtained by the latter process, but also can be varied in blending amount as occasion demands using one graft copolymer, and thus is advantageous in handling. From this and others, an EPT elastomer-containing vinyl chloride graft copolymer low in cost and excellent in processability is presently demanded for blending. However, no excellent process for production of such copolymer has been established yet.

Actually, most of the prior art processes for production of graft copolymers, wherein vinyl chloride monomers are graft-polymerized on EPT elastomers, are concerned with vinyl chloride graft copolymers less in content of ethylene-propylene copolymer or EPT elastomer. Based on these processes, there have been made various attempts to produce vinyl chloride graft copolymers high in content of EPT elastomer. However, the EPT elastomer is not easily soluble in a vinyl chloride monomer, and the resulting solution is so high in viscosity as to be deprived of its fluidity. According to the prior art processes, therefore, graft copolymers high in content of EPT elastomer cannot be obtained with efficiency. Further, in the suspension polymerization carried out under such high viscosity solution conditions as in the prior art processes, the diffusion of monomer is insufficient, so that not only a long polymerization time and a catalyst are required, but also it is difficult to effciently obtain a resin having an appropriate particle size distribution. This phenomenon tends to increase with increasing content of EPT elastomer. Moreover, even if the resins obtained by the prior art processes are in the form of uniform particles, the surfaces of said particles are in the state of so-called glass beads, so that no homogeneously mixed state can be attained at the time when the resins are blended and processed with vinyl chloride resins. Thus, the prior art processes have had a number of disadvantages.

With an aim to overcome the above-mentioned disadvantages of the prior art processes, we conducted studies to accomplish the present invention.

The EPT elastomer used in the present process is an ethylene-propylene copolymer containing a small amount of a diene compound. The content of propylene in the elastomer is preferably in the range from 20 to 50 wt%. The said diene compound includes dicyclopentadiene, ethylidenenorbornene, methylenenorbornene, 1,4-hexadiene, etc., and the content thereof is preferably from 2 to 30 in terms of iodine value. As the said EPT elastomer, one having a Mooney viscosity ($ML_{1+4}^{100°C}$) of 20 to 120 is preferable for use. The vinyl chloride monomer to be graft-polymerized on the EPT elastomer may contain a small amount of other monomer copolymerizable with said vinyl chloride. Examples of the said other monomer copolymerizable with vinyl chloride include olefins such as ethylene and propylene; vinyl esters such as vinyl acetate and vinyl stearate; vinyl ethers such as methyl vinyl ether and cetyl vinyl ether; acrylic and methacrylic acids, and their esters such as octyl acrylate and methyl methacrylate; organic acids and their anhydrides and esters such as maleic acid, fumaric acid, maleic anhydride and dioctyl fumarate; vinyl halides such as vinyl bromide and vinylidene chloride; and nitrile compounds such as acrylonitrile. The graft polymerization of vinyl chloride on the EPT elastomer is desirably carried out in in the presence of at least 10 wt%, preferably 10 to 60 wt%, of the EPT elastomer.

Examples of the aliphatic alcohol having not less than 8 carbon atoms, used in the present invention, include generally known compounds such as octyl alcohol, 2-ethylhexyl alcohol, decyl alcohol, lauryl alcohol, stearyl alcohol and palmityl alcohol. These may be used either singly or in admixture of two or more members. The amount of the aliphatic alcohol to be used is 0.1 to 10 wt% based on the total amount of said vinyl chloride monomer and EPT elastomer. If the amount of aliphatic alcohol is less than 0.1 wt%, the effect attained by addition of said alcohol becomes less, while even if the amount thereof is made more than 10 wt%, no more effect can be attained to cause economical disadvantage. The aliphatic alcohol is preferably added at the initial stage of the reaction, but may be added after dissolving the EPT elastomer in the vinyl chloride monomer.

The dispersant used in the present invention may be any of water-soluble dispersants which are employed in ordinary suspension polymerization of vinyl chloride, e.g. polyvinyl alcohols, celluloses such as methyl cellulose and hydroxyethyl cellulose, vinyl acetate-maleic acid copolymers, polyvinyl pyrrolidone and gelatin. Further, the said water-soluble dispersant may be used in combination with an oil-soluble dispersant such as ethyl cellulose. The amount of the dispersant is preferably 0.01 to 2 wt% based on the amount of the vinyl chloride monomer.

Further, as the polymerization initiator, there may be used any of such oil-soluble polymerization initiators as lauroyl peroxide, benzoyl peroxide, 3,5,5-trimethylhexanoyl peroxide, tert-butyl peroxypivalate, di-2-ethylhexyl peroxydicarbonate, azobisisobutyronitrile and azobisvaleronitrile, and initiators employed in the ordinary suspension polymerization of vinyl chloride.

In blending the vinyl chloride graft copolymer obtained by the present invention with a vinyl chloride resin, the amount of the graft copolymer, in terms of EPT elastomer, is 1 to 60 wt%, preferably 2 to 20 wt%, based on the total resin weight.

The vinyl chloride graft copolymer referred to in the present invention does not always mean one which is composed of only the graft copolymer in a truly scientific sense, but involves one which additionally contains a small amount of EPT elastomer or vinyl chloride homopolymer in a free state.

The vinyl chloride graft copolymer obtained by the present invention has a suitable particle size and, when blended with a vinyl chloride resin, gives a resin composition that is markedly excellent in processability.

The present invention is applicable to every suspension polymerization process capable of providing a uniform particle size of such an extent as desirable for final use of the product. Particularly when there is adopted a process, in which the EPT elastomer is dissolved in vinyl chloride in the presence of an oil-soluble initiator and then a dispersant is added to the resulting solution, it is possible to obtain a resin which is markedly uniform in particle size distribution. It is surprising that according to the present process, the polymerization speed becomes extremely high, and therefore the desired resin can be obtained in a short period of time with a high yield. Further, according to the present invention, little scale adhesion is brought about at the time of completion of polymerization, and the resulting graft copolymer is far more excellent in antistatic property and more advantageous in handling than a graft copolymer produced by an ordinary process. Thus, the process of the present invention has many advantages over the prior art processes.

The present invention is illustrated in detail below with reference to examples, but the invention is not limited to the examples. In the examples, all parts are by weight.

EXAMPLES 1-6

In a 300-liter autoclave, a mixture comprising 75 parts of vinyl chloride, 25 parts of an EPT elastomer (produced by Mitsubishi Yuka K.K.; ethylene content 75 parts, Mooney viscosity ($ML_{1+4}^{100°C.}$) 45, ethylidenenorbornene iodine value 15), 300 parts of water, a given amount of alcohol and 0.2 part of lauroyl peroxide was stirred at 30°C. for 3 hours to dissolve the elastomer in the vinyl chloride. To the resulting solution was added an aqueous solution containing 0.2 part of polyvinyl alcohol, and the mixed solution was polymerized at 60°C. until the pressure became 3.0 kg/cm$^2$ lower than the initial pressure. The polymerization product was recovered by filtration, dried and then incorporated with a polyvinyl chloride resin (Nikavinyl SG 1100) and additives, and the resulting mixture was blended and extruded under such conditions as mentioned later. For comparison, the case where no alcohol was added, and the cases where alcohols of less than 8 carbon atoms were used, are shown as Comparative Examples. The combination of the additives used had the following formulation.

Table 1

| Additives used | Parts |
| --- | --- |
| TVS No. 8813* | 0.2 |
| TVS No. 8831* | 0.3 |
| Calcium stearate | 1.0 |
| Hoechst Wax-OP | 0.5 |
| Stearic acid | 0.2 |

*An Sn type stabilizer produced by Nitto Kasei Co.

The additives shown in Table 1, the graft copolymer and a polyvinyl chloride resin (Nikavinyl SG 1100) were mixed together so that the amount of elastomer in the resulting mixture became 4.5 wt%, and the mixture was hot-blended by use of a Henschel mixer (up to 160°C.). This mixture was molded into a pipe by using a 40 mm. extruder with a 40-mesh screen and a 80-mesh screen, employing L/D = 22, CR (Compression ratio) = 2.0 and 1-inch pipe die. Other conditions are indicated below.

| Temperature conditions (°C.) | $C_1$ | $C_2$ | $C_3$ | D |
| --- | --- | --- | --- | --- |
| | 150 | 165 | 180 | 180 |

Screw rotation number: 30 r.p.m.

The results obtained were as set forth in Table 2.

Table 2

| | | Ex. 1 | Ex. 2 | Ex. 3 | Ex. 4 | Ex. 5 | Ex. 6 | Comparative Ex. 1 | Comparative Ex. 2 | Comparative Ex. 3 |
| --- | --- | --- | --- | --- | --- | --- | --- | --- | --- | --- |
| Alcohol | | Kalcohol No. 86* | Kalcohol No. 86 | Kalcohol No. 68** | Lauryl alcohol | Octyl alcohol | 2-Ethyl-hexyl alcohol | — | Methyl alcohol | n-Butyl alcohol |
| Amount | (parts) | 3.0 | 1.0 | 3.0 | 3.0 | 3.0 | 3.0 | — | 3.0 | 3.0 |
| Particle size | More than 32 meshes | 0.7% | 5.6% | 6.1% | 2.0% | 10.7% | 11.4% | 18.4% | 19.0% | 17.2% |
| | 32 to 60 meshes | 36.1 | 36.1 | 40.2 | 49.2 | 51.0 | 53.3 | 63.9 | 62.3 | 59.9 |
| | Less than 60 meshes | 63.2 | 58.3 | 53.7 | 48.8 | 38.3 | 35.3 | 18.7 | 18.7 | 22.9 |
| Polymerization time | | $9^{20}$ | $10^{35}$ | $10^{00}$ | $9^{20}$ | $12^{15}$ | $11^{45}$ | $14^{00}$ | $13^{45}$ | $14^{10}$ |
| Adhesion state | | Less | Less | Less | Less | Less | Less | Great | Great | Great |
| Electrification | | Low | Low | Low | Low | Low | Low | High | High | High |
| Appearance of pipe | | Markedly excellent | Markedly excellent | Markedly excellent | Markedly excellent | Excellent | Excellent | Inferior | Inferior | Inferior |

*Kalcohol No. 86 A product of Kao Soap K.K.; main ingredient stearyl alcohol.
**Kalcohol No. 68 A product of Kao Soap K.K.; main ingredient palmityl alcohol.

From the results of Table 2, it is understood that the process of the present invention is shorter in polymerization time and far higher in polymerization speed than the processes employed in Comparative Examples.

Comparative Example 4

The graft copolymer obtained in Comparative Example 1 was molded into a pipe in the same manner as in Examples 1-6, except that 0.5 part of Kalcohol No. 86 was added to the additives shown in Table 1. The thus obtained pipe was scarcely different from the pipe obtained in Comparative Example 1. Thus, the graft copolymer was not improved in processability when Kalochol No. 86 was added later.

EXAMPLE 7

In a 300-liter autoclave, a mixture comprising 80 parts of vinyl chloride, 20 parts of an EPT elastomer EP-82 (produced by Mitsubishi Yuka K.K.; ethylene content 55 wt%, Mooney viscosity ($ML_{1+4}^{100°C.}$) 40, dicyclopentadiene iodine value 10), 300 parts of water, 3 parts of Kalcohol No. 86 and 0.20 part of lauroyl peroxide was stirred at 30°C. for 3 hours to dissolve the said elastomer in the vinyl chloride. To the resulting solution was added an aqueous solution containing 0.2 part of hydroxypropyl methyl cellulose, and the mixed solution was polymerized at 60°C. for 10 hours. The polymerization product was recovered by filtration and then dried to obtain 87 parts of a homogeneous, white, opaque granular product. The content of EPT in the product was 22.7%. In this case, little adhesion of the product to the autoclave was observed.

EXAMPLE 8

Example 7 was repeated, except that the lauroyl peroxide was added after dissolution of the elastomer in the vinyl chloride, to obtain 83 parts of a product. This product was in the form of white and opaque particles. In this case also, little adhesion of the product to the autoclave was observed. Physical properties of the product of this example were found substantially same as those of Example 7, except of slightly poorer uniformity in particle size distribution.

EXAMPLE 9

Example 7 was repeated, except that 70 parts of vinyl chloride, 30 parts of an EPT elastomer EP-33 (produced by Mitsubishi Yuka K.K.; ethylene content 55 wt%, Mooney viscosity ($ML_{1+4}^{100°C.}$) 45, ethylidenenorborene iodine value 26) and 0.35 part of lauroyl peroxide were used in place of those employed in Example 7, to obtain 82 parts of a product. The content of EPT in the product was 38.0%. This product was molded into a pipe in the same manner as in Examples 1-6. The thus obtained pipe was excellent in appearance.

Comparative Example 5

Example 8 was repeated, except that Kalcohol No. 86 was not used. As the result, the yield of the produce was as low as 60 parts. This product was molded into a pipe in the same manner as Examples 1-6, but the pipe was inferior in appearance.

What we claim is:

1. A process for producing a vinyl chloride graft copolymer wherein vinyl chloride is graft-polymerized to an ethylene-propylene-diene copolymer thereby to obtain a vinyl chloride graft copolymer containing 10 – 60% by weight of the ethylene-propylene-diene copolymer, comprising carring out said graft-polymerization in the form of suspension polymerization in aqueous phase in the presence of an aliphatic alcohol of not less than 8 carbon atoms.

2. A process as claimed in claim 1, wherein said aliphatic alcohol is at least one member selected from the group consisting of octyl alcohol, 2-ethylhexyl alcohol, decyl alcohol, lauryl alcohol, stearyl alcohol and palmityl alcohol.

3. A process as claimed in claim 1, wherein said alcohol is used in amount of 0.1 to 10% by weight based on the total weight of the ethylene-propylene-diene copolymer plus the vinyl chloride monomer.

4. A process as claimed in claim 1, wherein said ethylene-propylene-diene copolymer has a Mooney viscosity ($ML_{1+4}^{100°C.}$) of 20–120.

5. A process as claimed in claim 1, wherein said ethylene-propylene-diene copolymer has the diene content of 2 –20 in terms of iodine value and the propylene content of 20 – 50% by weight, said diene content being derived from at least one member selected from the group consisting of dicyclopentadiene, ethylidenenorbornene, methylenenorbornene and 1,4-hexadiene.

6. A process as claimed in claim 1, wherein the ethylene-propylene-diene copolymer, the vinyl chloride monomer, water and the aliphatic alcohol together with an oil-soluble polymerization initiator are charged first to the reaction vessel and then the mixture is stirred to effect dissolution of said copolymer, and thereafter a dispersant is added to the mixture to initiate polymerization.

* * * * *